(12) United States Patent
Allen

(10) Patent No.: US 6,692,572 B1
(45) Date of Patent: Feb. 17, 2004

(54) ACTIVE COMPENSATION METERING SYSTEM

(75) Inventor: Randall Everett Allen, Troy, NY (US)

(73) Assignee: Precision Valve & Automation, Inc., Halfmoon, NY (US)

(*) Notice: Subject to any disclaimer, the term of this patent is extended or adjusted under 35 U.S.C. 154(b) by 0 days.

(21) Appl. No.: 09/395,087

(22) Filed: Sep. 13, 1999

(51) Int. Cl.⁷ .............................................. B05C 11/10
(52) U.S. Cl. ..................... 118/685; 118/684; 118/679; 118/694; 118/710; 118/713
(58) Field of Search .................... 118/688, 694, 118/679, 684, 685, 710, 712, 313, 315, 323

(56) References Cited

U.S. PATENT DOCUMENTS

| | | | |
|---|---|---|---|
| 4,794,314 A | * 12/1988 | Janu et al. ................ | 318/685 |
| 4,922,852 A | 5/1990 | Price | |
| 4,955,507 A | 9/1990 | Kirschner et al. | |
| 4,964,362 A | * 10/1990 | Dominguez ................ | 118/315 |
| 4,989,756 A | 2/1991 | Kagamihara et al. | |
| 5,319,568 A | 6/1994 | Bezaire | |
| 5,419,930 A | 5/1995 | Schucker | |
| 5,475,614 A | 12/1995 | Tofte et al. | |
| 5,507,435 A | * 4/1996 | Benest ........................ | 239/1 |
| 5,687,092 A | 11/1997 | Bretmersky et al. | |
| 5,695,817 A | * 12/1997 | Tateyama et al. .......... | 427/240 |
| 5,700,401 A | * 12/1997 | Weinberg et al. .......... | 261/27 |
| 5,730,323 A | 3/1998 | Osborne | |
| 5,747,897 A | * 5/1998 | Iwasa et al. ............... | 310/49 R |
| 5,772,764 A | * 6/1998 | Akimoto ..................... | 118/319 |
| 5,801,315 A | 9/1998 | Park et al. | |
| 5,906,682 A | 5/1999 | Bouras et al. | |
| 5,960,225 A | * 9/1999 | Fujimoto .................... | 396/611 |
| 6,001,181 A | * 12/1999 | Bullen ........................ | 118/679 |

OTHER PUBLICATIONS

Merriam–Webster's Collegiate Dictionary, 10$^{th}$ Ed., 1999, p. 1013.*

* cited by examiner

Primary Examiner—Richard Crispino
Assistant Examiner—George R. Koch, III
(74) Attorney, Agent, or Firm—Schmeiser, Olsen & Watts

(57) ABSTRACT

This invention relates generally to systems for depositing a material onto a surface, and more particularly, to control systems for metering the amount of material being dispensed. The present invention provides an active compensation metering system that automatically compensates for material changes due to changes in material pressure, material temperature, and material viscosity.

13 Claims, 3 Drawing Sheets

ACTIVE COMPENSATION METERING SYSTEM

FIELD OF THE INVENTION

The present invention relates generally to systems for depositing a material onto a surface, and more particularly, to control systems for metering the amount of material being dispensed.

BACKGROUND OF THE INVENTION

Materials are often applied over surfaces using a fluid dispensing system. Generally, the fluid dispensing system includes a reservoir, a material delivery system, an application apparatus, and a control system. The reservoir stores the material. The material may include a wide variety of materials such as paints, ultraviolet (UV) acrylic gels, moisture and thermal cure silicones, and the like. The material delivery system delivers the material from the reservoir to the application apparatus. The material delivery system may include conduits for carrying the material and a control valve to control the flow of material. The application apparatus may include a spraying and/or dispensing device, and a positioning apparatus, such as a multi-degree of freedom robotic positioning apparatus. The spraying or dispensing devices are commonly attached to the positioning apparatus, which provides accurate positional displacement relative to an article in which the material is being applied.

There are two basic methods of applying materials to surfaces. These include beads of material applied to specific locations on the article, and substantially uniform thickness coatings applied over large sections of the article. For most articles, the materials are typically applied using devices such as spray guns, spray nozzles, or dispensing nozzles. For spraying, such devices generally include a pressurized liquid material that is atomized by compressed gas and is then directed toward the surface to be coated. For dispensing, such devices generally include a pressurized liquid material that is dispensed through a nozzle tip in close proximity to the surface being coated.

Generally, the liquid material is applied during a fixed period of time. Unfortunately, changes in the viscosity of the liquid material may cause a change in the amount of liquid material that is applied to the surface during the fixed period of time. Temperature changes of the liquid material may produce a change in the liquid material viscosity. Commonly, ambient temperature changes occur in a production area, causing the viscosity of the liquid material to change. Also, changes in the pressure of the liquid material may result in a change in the amount of liquid material delivered during the fixed period of time. Additionally, some materials will change viscosity when subject to flow. Furthermore, a time-consuming manual adjustment of a control valve mounted on each spraying or dispensing apparatus is often necessary when these changes occur.

SUMMARY OF THE INVENTION

In order to overcome the above deficiencies, the present invention provides an active compensation metering system. The active compensation metering system automatically compensates for material changes due to changes in material pressure, material temperature, and material viscosity. A computerized controller included in the active compensation metering system can turn a plurality of spraying or dispensing valves on or off. Additionally, the active compensation metering system eliminates the necessity for an operator to manually adjust a control valve on the spraying or dispensing valve during a production cycle.

The present invention generally provides an apparatus comprising:
  a reservoir containing a material;
  an application apparatus for applying the material onto a surface;
  a material control valve apparatus for regulating a volume of the material flowing from the reservoir to the application apparatus;
  a flow measuring device for measuring the volume of the material flowing from the reservoir to the application apparatus; and
  a controller coupled to the flow measuring device for calculating a volume flow rate during a first interval of time, and for adjusting the material control valve to obtain a predetermined volume flow rate during a second interval of time.

BRIEF DESCRIPTION OF THE DRAWINGS

The features of the present invention will best be understood from a detailed description of the invention and a preferred embodiment thereof selected for the purposes of illustration and shown in the accompanying drawings in which.

DETAILED DESCRIPTION OF THE INVENTION

Figure 1:
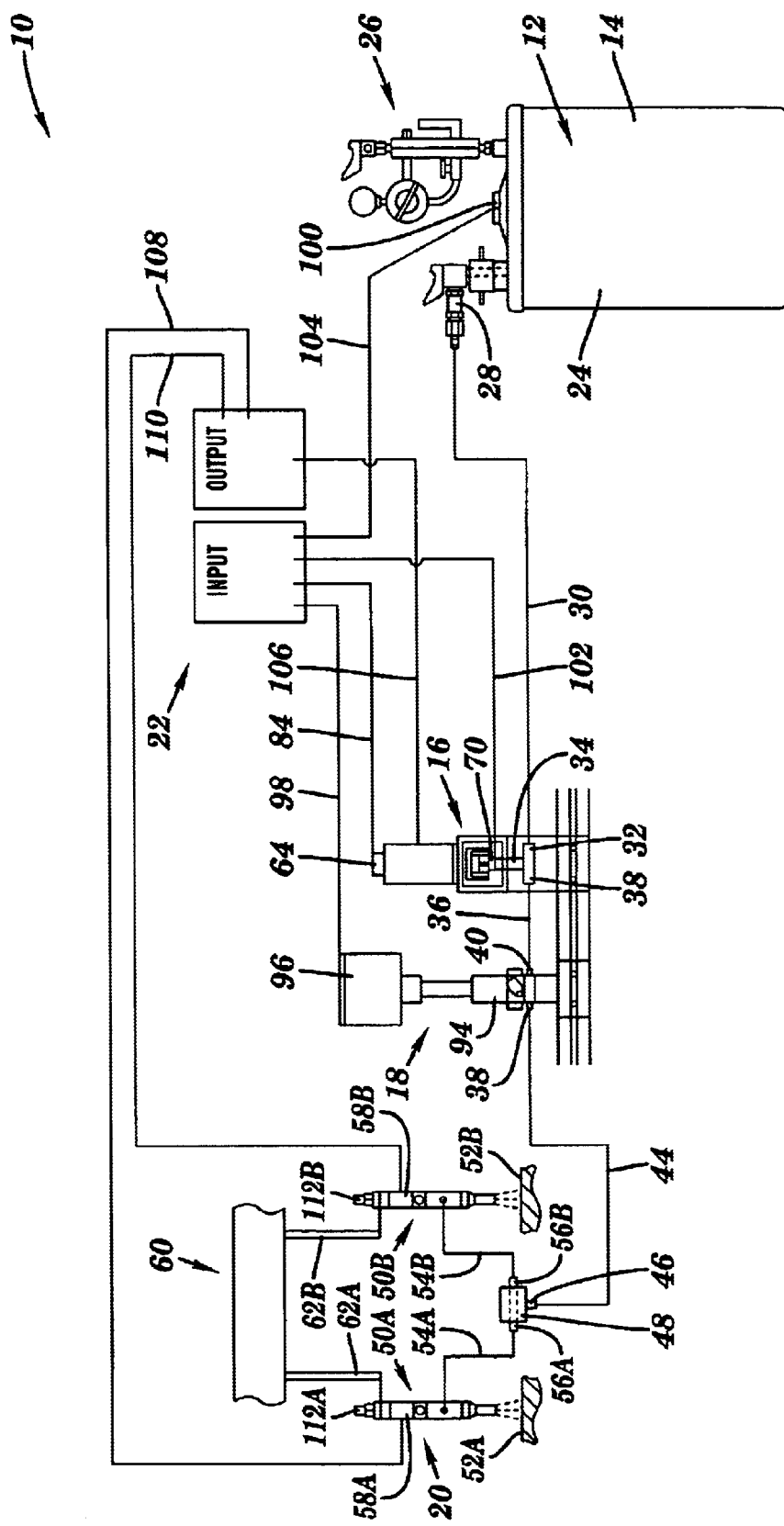
FIG. 1 illustrates a schematic drawing of an active compensation metering system in accordance with a preferred embodiment of the present invention.

Although certain preferred embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of the preferred embodiment. The features and advantages of the present invention are illustrated in detail in the accompanying drawings, wherein like reference numerals refer to like elements throughout the drawings. Although the drawings are intended to illustrate the present invention, the drawings are not necessarily drawn to scale.

FIG. 1 illustrates a schematic view of an active compensation metering system 10 in accordance with a preferred embodiment of the present invention. The active compensation metering system 10 includes a reservoir 12, a material 14 contained within the reservoir 12, a material control valve apparatus 16, a flow measuring device 18, an application apparatus 20, and a computerized controller 22. The reservoir 12 includes a pressurized vessel 24 containing the material 14. The material 14 may comprise, e.g., paints, ultraviolet (UV) acrylic gels, moisture and thermal cure silicones, etc. A regulated gas supply system 26 is connected to the pressurized vessel 24 and supplies gas pressure or force to the material 14 contained in the pressurized vessel 24. An outlet connector 28 is attached to the pressurized vessel 24. A conduit 30 connects the outlet connector 28 with an inlet port 32 of a metering valve 34. Material 14 flows from the pressurized vessel 24, through the outlet connector 28, through the conduit 30, and into the inlet port 32 of the metering valve 34. A conduit 36 connects an outlet port 38 of the metering valve 34 with an inlet port 40 of the flow measuring device 18. Material 14 flows from the outlet port 38 of the metering valve 34, through the conduit 36, and into the inlet port 40 of the flow measuring device 18. A conduit 44 connects the outlet port 39 of the flow measuring device 18 with an inlet port 46 of a manifold 48. Material 14 flows from the outlet port 39 of the flow measuring device 18, through the conduit 44, and into the inlet port 46 of the manifold 48.

The application apparatus 20 includes at least one applicator valve 50 (two are shown as 50A, 50B in FIG. 1). The applicator valves 50A, 50B may comprise a dispensing and/or spraying valve. For example, the applicator valve 50A can be a dispensing valve that applies a bead of material onto a surface 52A. Additionally, the applicator valve 50B can be a spraying valve that applies a substantially uniform thickness coating over a section of the surface 52B.

A conduit 54A connects the outlet port 56A of the manifold 48 with the applicator valve 50A. Material 14 flows from the manifold 48 thorough the conduit 54A and into the applicator valve 50A. A conduit 54B connects the outlet port 56B of the manifold 48 with the applicator valve 50B. Material 14 flows from the manifold 48 through the conduit 54B and into the applicator valve 50B. A fluid control element 58A and a fluid control element 58B are provided to turn on or shut off the flow of material 14 passing through the applicator valves 50A and 50B, respectively. The applicator valves 50A and 50B include flow adjusters 112A and 112B, respectively. The flow adjusters 112A and 112B are manually rotated by an operator to adjust the amount of material 14 flowing past the fluid control elements 58A and 58B, respectively. The material 14 leaving each applicator valve 50A and 50B is applied onto the surfaces 52A and 52B. The applicator valves 50A and 50B are attached to a multi-degree of freedom positioning apparatus 60 through members 62A and 62B, respectively. The multi-degree of freedom positioning apparatus 60, e.g., a positional robotic apparatus, can position the applicator valves 50A and 50B in a desired location over the surfaces 52A and 52B, respectively.

Figure 2:
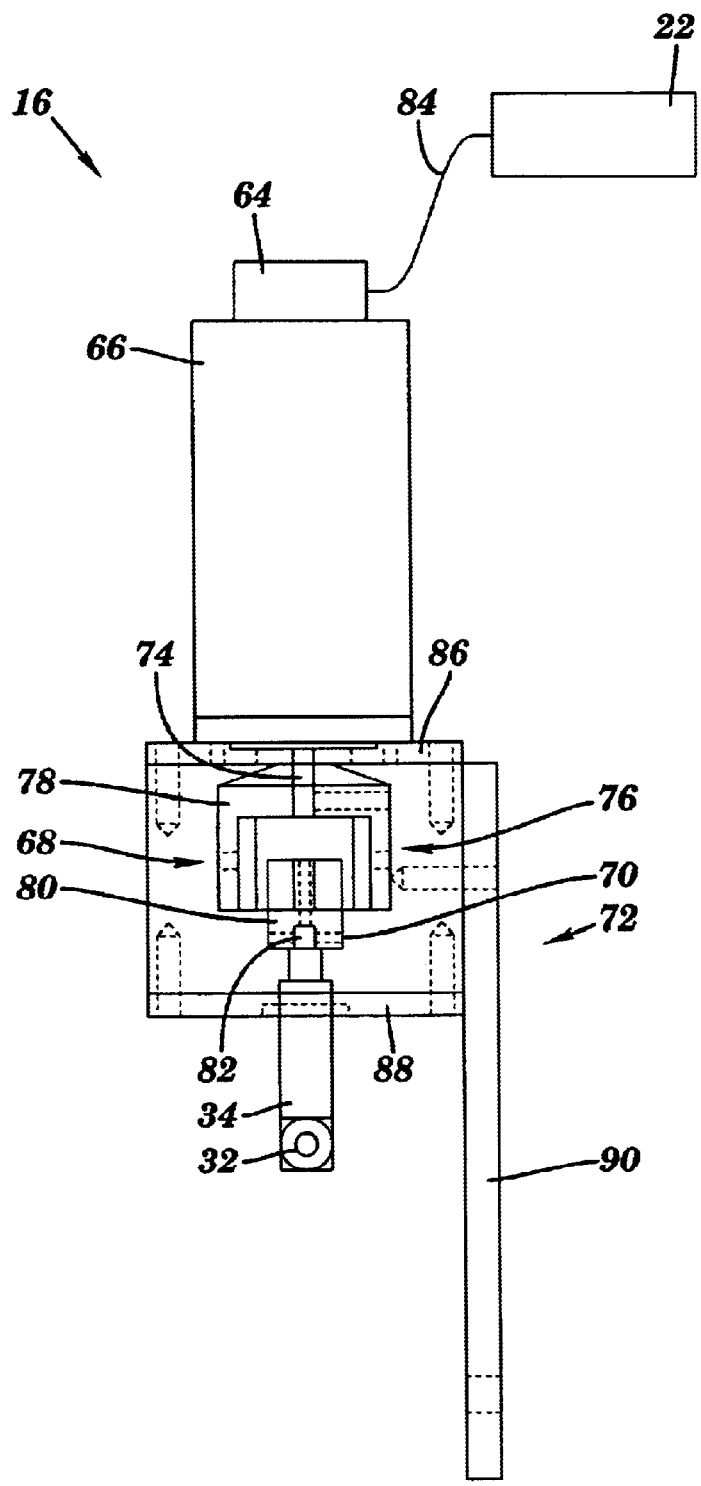
FIG. 2 illustrates a side view of a material control valve apparatus.
Figure 3:
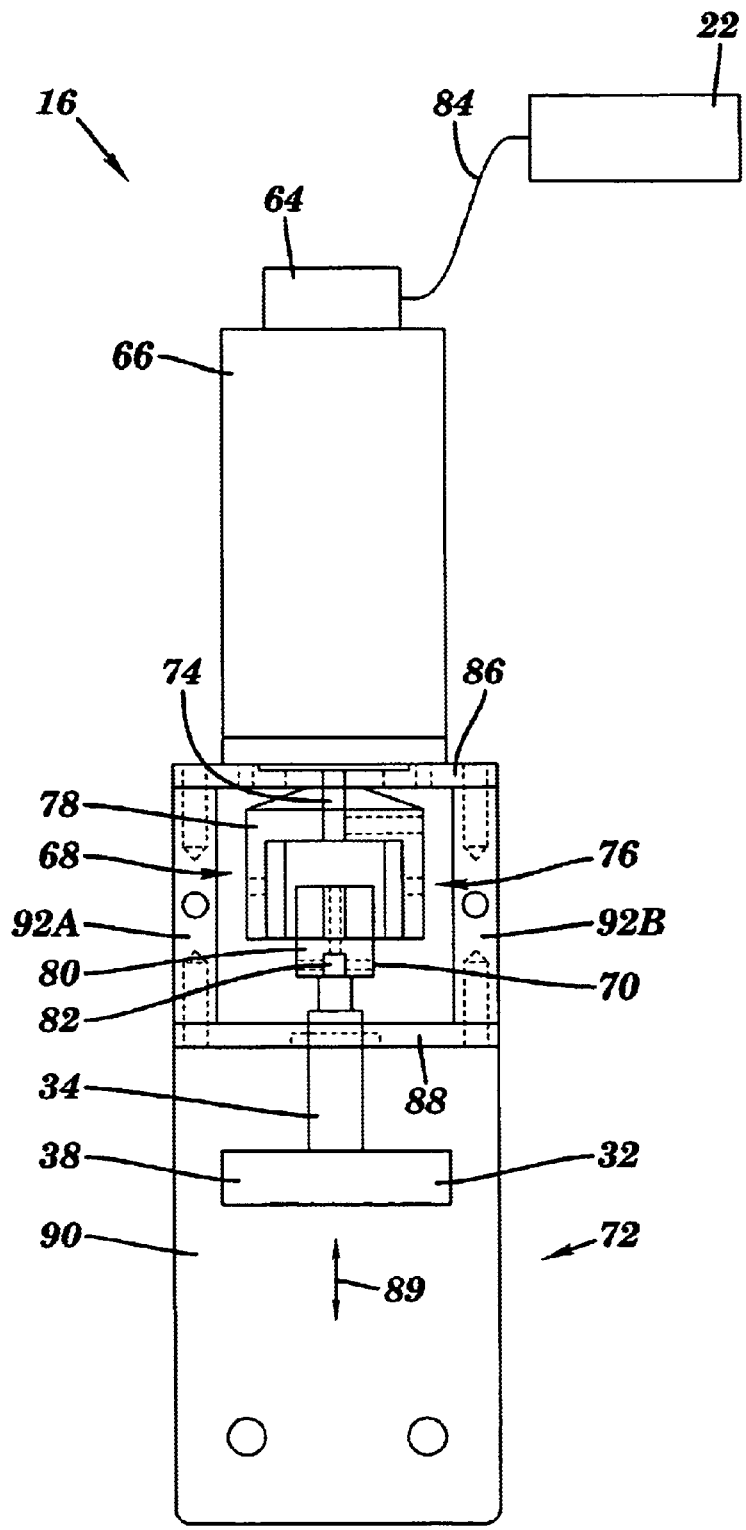
FIG. 3 illustrates a front view of the material control valve apparatus.

FIG. 2 illustrates a side view of the material control valve apparatus 16, and FIG. 3 illustrates a front view of the material control valve apparatus 16. The material control valve apparatus 16 includes a valve position encoder 64, a motor 66, a coupling apparatus 68, the metering valve 34, a limit sensor 70 and a support housing 72. Preferably, in the present invention, the motor 66 is a servo or stepper driven motor. The motor 66 includes an output shaft 74.

The coupling apparatus 68 connects the output shaft 74 of the motor 66 with the metering valve 34. The coupling apparatus 66 may include any suitable means to connect the output shaft 74 with the metering valve 34. In the present invention, the coupling apparatus 66 may be a magnetic coupling apparatus 76. The magnetic coupling apparatus 76 includes a first member 78 attached to the output shaft 74 of the motor 66, and a second member 80 attached to a shaft 82 of the metering valve 34. The first member 78 and the second member 80 do not physically contact each other, however, they are magnetically coupled so that rotation of the first member 78 causes rotation of the second member 80. Rotation of the shaft 82 of the metering valve 34 causes the threaded portion (not shown) of the shaft 82 to move in an axial direction as indicated by the directional arrow 89 in FIG. 3. This axial-movement of the shaft 82 is accomplished by the free axial movement allowed between the first member 78 and the second member 80 of the magnetic coupling apparatus 76. Thus, rotation of the output shaft 74 of the motor 66 rotates the first member 78, the second member 80, and the shaft 82 of the metering valve 34. The metering valve 34 is opened or closed by the rotation of the motor in a clockwise or counter-clockwise direction.

In another embodiment of the present invention, the coupling apparatus 66 may comprise a splined coupling (not shown) that allows free axial movement between the output shaft 74 of the motor 66 and the shaft 82 of the metering valve 34.

The valve position encoder 64 provides rotational positional information of the metering valve 34 (e.g., digital counts) to the computerized controller 22 through a cable 84.

The support housing 72 includes a motor support plate 86, a metering valve support plate 88, a plurality of struts 92A, 92B, and a mounting plate 90. The motor 66 is attached to the motor support plate 86, and the metering valve 34 is attached to the metering valve support plate 88. Struts 92A and 92B are attached to the motor support plate 86 and the metering valve support plate 88. The motor support plate 86 and the metering valve 34 are attached to the mounting plate 90. The mounting plate 90 is attached to a support structure (not shown).

As illustrated in FIG. 1, the flow measuring device 18 includes a flow meter 94 and a flow volume encoder 96. The flow meter 94 measures the volume of material 14 flowing through the flow measuring device 18 to the application apparatus 20. The flow volume encoder 96 sends the information corresponding to the volume of material 14 flowing to the application apparatus 20 to the computerized controller 22 through the cable 98. Preferably, in the present invention, the flow volume encoder 96 sends digital information such as counts per cubic centimeter, or counts per gallon.

As illustrated in FIG. 1, the computerized controller 22 receives information from the flow measuring device 18, from the material control apparatus 16, from the limit sensor 70, and from a low level sensor 100. The flow volume encoder 96 sends the information corresponding to the volume of material 14 flowing to the application apparatus 20 from the flow measuring device 18 to the computerized controller through the cable 84. The valve position encoder 64 sends rotational position information of the metering valve 34 to the computerized controller 22 through the cable 98. The limit sensor 70 sends positional limit information from the metering valve 34 to the computerized controller 22 through a cable 102. The positional limit information is used by the computerized controller 22 to ensure that the metering valve 34 is kept within a specified operating range. The low level sensor 100 sends information to the computerized controller 22 through a cable 104. The low level sensor 100 indicates when the material 14 level falls below a desired level in the reservoir 12. When this low level occurs, the computerized controller 22 alerts the operator to increase the material level in the reservoir 12. The computerized controller 22 can sound an alarm such a loud noise or a flashing light to alert the operator. Additionally, the computerized controller 22 may stop the application process when the low level occurs.

The computerized controller 22 operates the motor 66 of the material control valve apparatus 16 through a cable 106. The motor 66 is rotationally operated to open or close the metering valve 34. The valve position encoder 64 provides actual rotational positional information of the metering valve 34 so that the computerized controller 22 can operate the motor 66 to obtain a specific desired metering valve 34 opening.

The computerized controller 22 controls the fluid control elements 58A, 58B through cables 108, 110, respectively. The fluid control elements 58A, 58B are activated to turn on or shut off the flow of material 14 through the applicator valves 50A and 50B, respectively.

In operation, the computerized controller 22 activates the fluid control elements 58A, 58B to turn on the flow of material 14 flowing through the applicator valves 50A and 50B onto the surfaces 52A and 52B. The computerized controller 22 determines a first volume of material 14 that passes through the flow measuring device 18 during a first interval of time. The computerized controller 22 turns off the material 14 flowing through the applicator valves 50A and 50B at the end of the first interval of time. During this first interval of time, the computerized controller 22 acquires the first volume of material 14 measurement from the flow volume encoder 96 during the time from the start of the first interval of time to the end of the first interval of time.

Additionally, during the first interval of time the computerized controller 22 accumulates a first total length of time during which any applicator valve 50A and 50B is open. Next, the computerized controller 22 calculates a first volume material 14 flow rate by dividing the first volume of material 14 by the first total length of time during which any applicator valve 50A or 50B is open.

Next, the computerized controller 22 compares the first volume of material 14 flow rate to a predetermined volume flow rate. The predetermined volume flow rate indicates the desired amount of material 14 to be applied onto the surfaces 52A and 52B by all of the applicator valves (e.g., 50A and 50B), respectively.

If the first volume of material 14 flow rate is less than the predetermined volume flow rate, the computerized controller 22 adjusts the metering valve 34 to a further open position by sending a command to the motor 66 of the material control valve apparatus 16. The valve position encoder 64 verifies the opening of the metering valve 34. If the first volume flow rate is greater than the predetermined volume flow rate, the computerized controller 22 adjusts the metering valve 34 to a further closed position by sending a command to the motor 66 of the material control valve apparatus 16.

The computerized controller 22 determines a second volume of material 14 that passes through the flow measuring device 18 during a second interval of time. The computerized controller activates the fluid control elements 58A, 58B to turn on the flow of material 14 through the applicator valves 50A and 50B onto the surfaces 52A and 52B. During this second interval of time, the computerized controller 22 acquires the second volume of material 14 measurement from the flow volume encoder 96 during the time from the start of the second interval of time to the end of the second internal of time. The computerized controller than deactivates the fluid control elements 58A, 58B to turn off the flow of material 14 through the applicator valves 50A and 50B onto the surfaces 52A and 52B. Next, the computerized controller 22 calculates a second volume of material 14 flow rate by dividing the second volume of material 14 by the second interval of time. Next, the computerized controller 22 compares the second volume flow rate to the predetermined volume flow rate. If further adjustment is necessary the computerized controller 22 further opens or closes the metering valve 34 and repeats the above process, until the desired predetermined volume flow rate is achieved.

Thus, as the viscosity or pressure of the material 14 varies, the active compensation metering system is able to adjust the metering valve 34 to maintain a desired standard material flow rate that results in a desired material 14 application thickness and coverage by the plurality of applicator valves 50A and 50B onto the surfaces 52A and 52B. Also, if the applicator valves 50A and 50B speed of movement over the surfaces 52A and 52B should change, the active compensation metering system is able to adjust the metering valve 34 to maintain the desired standard material flow rate that results in a desired material 14 application thickness and coverage by the plurality of applicator valves 50A and 50B onto the surfaces 52A and 52B.

Initial manual adjustment of the flow adjuster 112A and 112B is generally required prior to turning on the active compensation metering system 10. Further, manual adjustment of the flow adjuster 112A and 112B is not required after the active compensation metering system 10 is activated, since the computerized controller 22 can automatically adjust the metering valve 34 to provide the predetermined flow rate.

The foregoing description of the present invention has been presented for purposes of illustration and description. It is not intended to be exhaustive or to limit the invention to the precise form disclosed, and many modifications and variations are possible in light of the above teaching. For example, a plurality of material 14 application devices (e.g., spray guns, spray nozzles, dispensing devices, etc.) can be simultaneously connected to the active compensation metering system 10. The application devices may apply material 14 onto a wide variety of surfaces (e.g., metal, circuit boards, plastic, etc.). Such modifications and variations that may be apparent to a person skilled in the art are intended to be included within the scope of this invention as defined by the accompanying claims.

I claim:

1. An apparatus comprising:
   a reservoir containing a coating material;
   a bead dispensing valve for applying the coating material onto a surface of an inorganic production article wherein the bead dispensing valve includes a fluid control element for turning the material flow on or off and a multi-degree of freedom robotic positioning apparatus to position the application apparatus relative to the surface of the inorganic production article;
   a material control valve apparatus for regulating a volume of the coating material flowing from the reservoir to the bead dispensing valve;
   a flow measuring device for measuring the volume of the coating material flowing from the reservoir to the bead dispensing valve; and
   a controller coupled to the flow measuring device for calculating a volume flow rate during a first interval of time, and for adjusting the material control valve to obtain a predetermined volume flow rate during a second interval of time.

2. The apparatus of claim 1, wherein the reservoir is a pressurized vessel.

3. The apparatus of claim 1, wherein the controller further includes a low level sensor that measures a material level in the reservoir, and wherein the controller notifies an operator if the material level falls below a predetermined level.

4. The apparatus of claim 1, wherein the material control valve apparatus further includes;
   a motor for opening and closing a valve;
   a limit sensor for providing axial position information of the valve to the controller;
   a valve position encoder for providing valve opening information to the controller; and
   a magnetic coupling connecting the valve to the motor.

5. The apparatus of claim 1, wherein the material control valve apparatus further includes;
   a motor for opening and closing a valve;
   a limit sensor for providing axial position information of the valve to the controller;
   a valve position encoder for providing valve opening information to the controller; and
   a splined coupling connecting the valve to the motor.

6. The apparatus of claim 1, wherein the flow measuring device further includes a flow volume encoder to provide the information corresponding to the volume amount of material flowing from the reservoir to the bead dispensing valve to the controller.

7. The apparatus of claim 1, wherein the surface is a surface of a circuit board.

8. The apparatus of claim 1, wherein the robotic positioning apparatus has at least three degrees of freedom.

9. The apparatus of claim 1, further comprising a spray valve.

10. An apparatus comprising:
- a reservoir containing a coating material;
- a bead dispensing valve for applying the coating material onto a surface of an inorganic production article and a multi-degree of freedom robotic positioning apparatus to position the bead dispensing valve relative to the surface of the inorganic production article;
- a material control valve apparatus for regulating a volume of the coating material flowing from the reservoir to the bead dispensing valve;
- a flow measuring device for measuring the volume of the coating material flowing from the reservoir to the bead dispensing valve; and
- a controller coupled to the flow measuring device for calculating a volume flow rate during a first interval of time, and for adjusting the material control valve to obtain a predetermined volume flow rate during a second interval of time.

11. The apparatus of claim 10, wherein the bead dispensing valve further includes a fluid control element for turning the material flow on or off.

12. The apparatus of claim 11, wherein the fluid control element is controlled by the controller.

13. The apparatus of claim 10, further comprising a spray valve.

* * * * *

UNITED STATES PATENT AND TRADEMARK OFFICE
CERTIFICATE OF CORRECTION

PATENT NO. : 6,692,572 B1  Page 1 of 1
DATED : February 17, 2004
INVENTOR(S) : Randall Everett Allen It is certified that error appears in the above-identified patent and that said Letters Patent is hereby corrected as shown below:

Drawings,
Figure 1 and Figure on title page, delete the "38" on the left and insert -- 39 --.

Signed and Sealed this

Fourteenth Day of September, 2004

JON W. DUDAS
*Director of the United States Patent and Trademark Office*